Jan. 27, 1959     J. N. BEEBE     2,871,460
VELOCITY MEASURING APPARATUS
Filed May 12, 1955
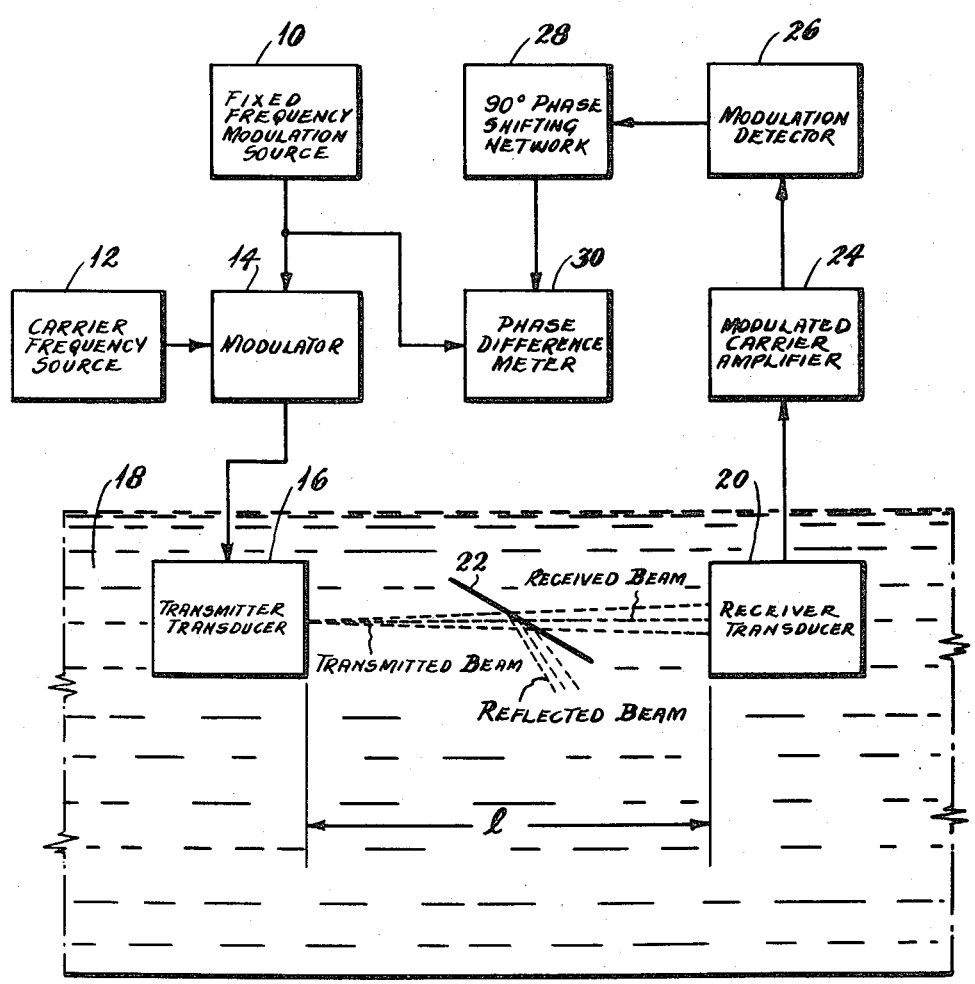
INVENTOR.
JOHN N. BEEBE

United States Patent Office 2,871,460
Patented Jan. 27, 1959

2,871,460

VELOCITY MEASURING APPARATUS

John N. Beebe, Millis, Mass., assignor, by mesne assignments, to the United States of America as represented by the Secretary of the Navy Application May 12, 1955, Serial No. 508,003

5 Claims. (Cl. 340—3)

This invention relates to apparatus for measuring the velocity of acoustic waves in a fluid and, more particularly, to apparatus for measuring the velocity of acoustic waves in a fluid such as sea water.

The usual method of measuring the velocity of acoustic waves in a fluid such as sea water involves placing a transmitter transducer and a receiver transducer face to face in a water path and applying a fixed frequency driving signal to the transmitter transducer. Acoustic waves are generated at the fixed frequency by the transmitter transducer in response to the driving signal and are directed toward the receiver transducer. A signal is induced in the receiver transducer, at the fixed frequency, in response to the acoustic waves impinging thereon. However, a portion of the acoustic waves impinging on the receiver transducer is reflected back to the transmitter transducer and is received thereby. Thus, standing waves are produced between the two transducers.

The amplitude and phase of the acoustic waves transmitted by the transmitter transducer and received by the receiver transducer, respectively, relative to the amplitude and phase of the driving signal depends upon the amplitude and phase of the reflected acoustic waves impinging on the transmitter transducer relative to the amplitude and phase of the driving signal. The amplitude of the received signal is a minimum when the reflected waves arriving at the transmitter transducer are 180 degrees out of phase with the driving signal. This occurs when the physical separation between the two transducers is an integral number of half-wavelengths at the fixed frequency.

The prior method of measuring the velocity of acoustic waves in a fluid such as sea water was to manually adjust the spacing between the two transducers until the amplitude of the signal received by the receiver transducer was a minimum. By measuring the physical separation between the two transducers and knowing the signal frequency and the possible range of velocities of the acoustic waves, the velocity of the acoustic waves could be computed.

The invention described herein obviates the need for manually adjusting the spacing between the two transducers and permits a continuous measure of the velocity of the acoustic waves to be made as a function of time. This is accomplished by eliminating phase distortion resulting from standing waves.

Briefly, this invention contemplates superimposing a low-frequency modulation on a high frequency carrier and measuring the phase difference of the low-frequency modulation between the driving signal and the received signal. An advantage to this method lies in the fact that a large phase shift of the carrier wave will cause only a small phase shift of the lower modulation frequency. The phase shift in the transducers due to various causes will also be reduced in a like manner. In addition, to further eliminate the distortion resulting from standing wave, an attenuating baffle is placed in the path of acoustic wave between the two transducers.

It is therefore an object of this invention to provide apparatus for measuring the velocity of acoustic wave in a fluid which does not require adjustment of the spacing between the transmitter and receiver transducers.

It is a further object of this invention to provide apparatus for measuring the velocity of acoustic waves in a fluid which eliminates phase distortion resulting from standing waves between the transmitter and receiver transducers.

Other objects and many of the attendant advantages of this invention will be readily appreciated as the same becomes better understood by reference to the following detailed description when considered in connection with the accompanying drawing wherein the sole figure is a block diagram of a preferred embodiment of this invention.

Referring now to the figure, fixed frequency modulation source 10 and carrier frequency source 12 are applied as first and second inputs, respectively, to modulator 14, which amplitude modulates the carrier frequency with the fixed frequency. The output of modulator 14 is applied as an input driving signal to transmitter transducer 16 which is immersed in fluid 18. Transmitter transducer 16 transmits a beam of acoustic waves in response to the driving signal applied thereto from modulator 14.

Also immersed in fluid 18 is receiver transducer 20. Receiver transducer 20 is located at a fixed distance "*l*" from transmitter transducer 16, facing transmitter transducer 16, so as to be in the path of the transmitted beam of acoustic waves.

Disposed intermediate transmitter transducer 16 and receiver transducer 20, in the path of the transmitted beam of acoustic waves, is attenuating baffle 22. Attenuating baffle 22 consists of a thin plate, such as a sheet of Monel metal 10 mils thick, placed at an oblique angle with respect to the direction of the transmitted beam of acoustic waves.

Receiver transducer 20 produces a signal output in response to the acoustic waves impinging thereon. The signal output of receiver transducer 20 is applied as an input to modulated-carrier amplifier 24. The output of modulated-carrier amplifier 24 is applied as an input to modulation detector 26, which demodulates the modulated carrier to provide a signal having the same fixed frequency as the output from fixed-frequency modulation source 10. The output of modulation detector 26 is applied as an input to 90 degree phase shifting network 28. The output from fixed-frequency modulation source 10 is applied as a first input to phase difference meter 30 and the output of 90 degree phase shifting network 28 is applied as a second input to phase difference meter 30. Phase difference meter 30 produces an indication of the difference in phase between the signals applied to its two inputs.

Considering now the operation of the invention, the driving signal applied to transmitter transducer 16 consists of a high frequency carrier amplitude-modulated by the low fixed frequency of modulation source 10. The beam of acoustic waves transmitted from transmitter transducer 16, therefore, have a high frequency. This ensures that the transmitted beam is narrow.

The transmitted beam in traveling between transmitter transducer 16 and receiver transducer 20 impinges on baffle 22. Baffle 22 reflects most of the energy in the transmitted beam impinging thereon into a reflected beam which is so directed that it does not contact either receiver transducer 20 or transmitter transducer 16. The small amount of energy in the transmitted beam which is not reflected is passed on to receiver transducer 20, where it induces a received signal therein.

The range of possible velocities of acoustic waves in any given fluid can be obtained from handbooks. In sea water, for instance, the velocity varies between 4500 feet per second and 5100 feet per second, depending upon the salinity and temperature of the sea water. The fixed distance "l" between transmitted transducer 16 and receiver transducer 20 is chosen to be an integral number of half-wavelengths of the fixed frequency of source 10 at the mid-velocity of the range of possible velocities, i. e., 4800 feet per second for sea water. The distance "l," moreover, should be less than the chosen integral number of half-wavelengths plus one at the minimum velocity of the range of possible velocities and more than the chosen integral number of half wavelengths minus one at the maximum velocity of the range of possible velocities.

In the apparatus which was actually constructed the baffle provided 20 decibels of attenuation between the transmitted transducer 16 and receiver transducer 20. Therefore, any acoustic waves reflected from receiver transducer 20 back to transmitter transducer 16 were attenuated at least 40 decibels. Thus, the phase distortion produced at the fixed frequency of modulation source 10 between the driving signal applied to transmitter transducer 16 and the transmitted beam is negligible.

The small signal induced in receiver transducer 20 is amplified by modulated-carrier amplifier 24 and then demodulated by modulation detector 26 to provide an output from modulation detector 26 which has the fixed frequency of modulation source 10, but is shifted in phase therefrom by an amount proportional to the difference between the actual velocity of the acoustic waves through the fluid and the mid-velocity of the range of possible velocities.

The output of modulation detector 26, after being phase shifted 90 degrees, is compared with the output of fixed frequency modulation source 10 in phase difference meter 30. The purpose of shifting the phase of the output of modulation detector 26 90 degrees is so that phase difference meter 30 will read mid-scale when the velocity of the acoustic waves is equal to the mid-velocity of the range of possible velocities.

In the apparatus actually constructed the distance "l" was chosen as equal to 3½ wavelengths at the mid-velocity of acoustic waves in sea water, i. e., 4800 feet per second. Therefore, phase difference meter 30 will give a reading of 11¼ degrees for a velocity of 4500 feet per second, the minimum velocity of acoustic waves in sea water, 90 degrees for a velocity of 4800 feet per second, the mid-velocity of acoustic waves in sea water, and 168¾ degrees at 5100 feet per second, the maximum velocity of acoustic waves through sea water. The readings of phase difference meter 30 for intermediate velocities would be in between these values.

Obviously many modifications and variations of the present invention are possible in the light of the above teachings. It is therefore to be understood that within the scope of the appended claims the invention may be practiced otherwise than as specifically described.

I claim:

1. In combination, a first source of electrical waves having a fixed first frequency, a second source of electrical waves having a second frequency which is high relative to said first frequency, modulation means coupled to said first and second sources for amplitude modulating said second-frequency electrical waves with said first-frequency electrical waves, a transmitter electromechanical transducer immersed in a fluid wherein the range of velocity of acoustic waves is known, means for applying the output of said modulation means as an input to said transmitter transducer for transmitting a beam of acoustic waves, a receiver electromechanical transducer immersed in said fluid and located a fixed distance from said transmitter transducer in the path of said beam, whereby said receiver transducer produces an output in response to acoustic waves of said beam impinging thereon, said fixed distance being equal to an integral number of half-wavelengths at the mid velocity of acoustic waves in said fluid and at said first frequency, whereby said distance is less than said integral number of half-wavelengths plus one at the minimum velocity of said range and is more than said integral number of half-wavelengths minus one at the maximum velocity of said range, amplifying and detecting means, means for applying the output of said receiver means as an input to said amplifying and detecting means to produce an output therefrom having said first frequency, a phase shifting network coupled to said amplifying and detecting means for shifting the phase of the output therefrom ninety degrees, and a phase difference meter having the output of said first source applied thereto as a first input and the output of said phase shifting network applied thereto as a second input, and a baffle in the form of a thin continuous plate that is of sufficient area to intercept the entire beam and located intermediate said transmitter and receiver transducers in the path of said beam and oriented at an oblique angle with respect to the direction of said transmitted beam for reflecting most of the energy of said beam away from said receiver and transmitter transducers to thereby allow only a small portion of the energy of said beam to reach said receiver transducer, whereby standing waves between said transmitter and receiver are substantially eliminated.

2. Apparatus for indicating the velocity of compressional wave energy through a fluid medium wherein the range of velocity of compressional wave energy therethrough is between predetermined upper and lower limits depending upon variations in the fluid, said apparatus comprising: an electromechanical transmitter transducer and an electromechanical receiver transducer within said fluid medium in face-to-face relationship and spaced a predetermined distance apart; first means generating oscillatory electrical energy at a predetermined frequency; second means coupling said oscillatory energy from said first means into said transmitter transducer whereby the latter generates compressional wave energy including energy at said predetermined frequency and said receiver transducer upon intercepting some of said compressional wave energy generates corresponding electrical energy, said predetermined spacing and said predetermined frequency being related to one another such that the distance between said transducers is an integral number of half-wavelengths corresponding to said predetermined frequency when the compressional wave velocity through said fluid is midway between said predetermined limits of velocity and said distance is less than said integral number of half wavelengths plus one at the lower velocity limit and is greater than said integral number of half wavelengths minus one at the upper velocity limit, third means coupled to said receiver transducer and extracting from the electrical energy therefrom energy at said predetermined frequency, phase difference means for indicating the difference between the phase of energy input to said transmitter transducer at said predetermined frequency and energy from said receiver transducer at said predetermined frequency, and a flat continuous uniform baffle plate between said transducers and oblique to the spacing between said transducers and of sufficient area such that it intercepts all compressional wave energy moving from said transmitter transducer to said receiver transducer and deflecting away from both said transducers a substantial portion thereof and transmitting the remainder thereof to said receiver transducer, said baffle also intercepting all of the compressional wave energy that is reflected by said receiver transducer back to said transmitter transducer and deflecting away from both said transducers a substantial portion of the reflected energy whereby the amount of receiver-reflected energy arriving at said transmitter transducer is so attenuated as to have negligible effect on the phase of the compressional wave energy of said predetermined frequency generated by said transmitter transducer.

3. Apparatus for indicating the velocity of compressional wave energy through a fluid medium as defined in claim 2 wherein said second means is a modulator and further comprising a source of oscillatory electrical energy of a frequency substantially higher than said predetermined frequency coupled to said second means whereby the output of said second means is a modulated carrier, whereby the compressional wave energy generated by said transmitter transducer and directed toward said receiver transducer is in a narrow beam.

4. Apparatus for indicating the velocity of compressional wave energy through a fluid medium as defined in claim 3 further comprising a phase shifter connected between said phase difference means and said third means whereby said phase shifter indication is substantially midway between maximum and minimum when the compressional wave velocity is midway between the upper and lower limits.

5. In an apparatus for transmitting intelligence across a fluid medium in the form of compressional waves and of the type including an electromechanical transmitter transducer and an electromechanical receiver transducer within said fluid medium and spaced apart in face-to-face relationship and means for providing oscillatory electrical energy of a predetermined frequency to said transmitter whereby said transmitter generates corresponding compressional waves in the fluid medium which at least in part are intercepted by said receiver, part of the incident compressional wave energy being absorbed thereby and part being reflected thereby back to said transmitter and means for comparing the phase of energy of said frequency as it is provided to said transmitter with that incident to said receiver, the improvement which comprises the combination therewith of a baffle for minimizing the amount of said reflected energy reaching said transmitter and tending to modify the phase and amplitude of compressional waves generated thereby relative to the oscillatory electrical energy input thereto, said baffle being a flat continuous uniform plate between said transducers and oblique to the spacing between said transducers and of sufficient area such that it intercepts all compressional wave energy moving from said transmitter to said receiver and deflecting away from both said transducers a substantial portion thereof and transmitting the remainder thereof to said receiver transducer, said baffle also intercepting all of the compressional wave energy that is reflected by said receiver back to said transmitter and deflecting away from both of them a substantial portion of the reflected energy whereby the amount of receiver-reflected energy deriving at said transmiter is so attenuated so as to have negligible effect on the phase and amplitude of the compressional wave energy of said frequency generated by said transmitter.

References Cited in the file of this patent

UNITED STATES PATENTS

| | | |
|---|---|---|
| 1,144,306 | Mock | June 22, 1915 |
| 2,147,810 | Alford | Feb. 21, 1939 |
| 2,480,646 | Grabau | Aug. 30, 1949 |
| 2,515,221 | Henning | July 18, 1950 |
| 2,641,754 | Clegg | June 9, 1953 |
| 2,710,959 | Pierce | June 14, 1955 |

OTHER REFERENCES

Ridenour: Radar System Engineering, M. I. T. Radiation Lab. Series, copyright 1947, pp. 139–143.